United States Patent [19]

Pass

[11] Patent Number: 4,597,647

[45] Date of Patent: Jul. 1, 1986

[54] NASAL EQUIPMENT FOR SPECTACLE FRAME AND CORRESPONDING SPECTACLE FRAME

[75] Inventor: Michel Pass, Saint Mihiel, France

[73] Assignee: Essilor International (Compagnie Generale d'Optique), Creteil, France

[21] Appl. No.: 632,537

[22] Filed: Jul. 19, 1984

[30] Foreign Application Priority Data

Aug. 5, 1983 [FR] France ................................ 83 12971

[51] Int. Cl.⁴ .......................... G02C 5/02; G02C 5/12
[52] U.S. Cl. ................................... 351/133; 351/140; 351/137; 351/149
[58] Field of Search ............... 351/133, 136, 137, 138, 351/132, 140, 149

[56] References Cited

U.S. PATENT DOCUMENTS 4,280,758  7/1981  Flader .............................. 351/137 X

FOREIGN PATENT DOCUMENTS 1133205  11/1968  United Kingdom ................ 351/137

*Primary Examiner*—Rodney B. Bovernick
*Attorney, Agent, or Firm*—Burgess, Ryan & Wayne

[57] ABSTRACT

Nasal equipment for spectacle frame of the type comprising in a single piece a central bar and two lateral pads each intended to interlock on the corresponding eyewire of the frame. In a central bar is provided at least one recess in which is disposed at least one interlocking element intended to cooperate with a recess provided in each eyewire of the frame.

8 Claims, 2 Drawing Figures

NASAL EQUIPMENT FOR SPECTACLE FRAME AND CORRESPONDING SPECTACLE FRAME

BACKGROUND OF THE INVENTION

Field of the invention

The present invention is related to spectacle frames.

As it is known, a spectacle frame comprises two lens surrounds or eyewires connected to each other by a median bridge and two lateral temples, each of them being hinged on the corresponding eyewire.

Nasal equipment is provided in the zone of the median bridge, to allow resting on the wearer's nose.

It has already been proposed, in French patents published under Nos. 2,203,987 and 2,419,526 to associate to a spectacle frame nasal equipment adapted to the morphological characteristics of the wearer.

Such nasal equipment comprises a single piece with two lateral pads adapted to interlock individually on the corresponding eyewire of the frame, these two pads being connected to each other at their upper portion by a central bar.

After having selected a spectacle frame, the wearer can adapt without any difficulty the nasal equipment most appropriate to his morphology.

In French patent publication No. 2,203,987, it is proposed to associate to the lateral interlocking the pads on the eyewires an interlocking of the same type of the central bar on the median bridge.

This type of detachable assembly presents the drawback of being unstable since the nasal equipment can become inadvertently detached from the spectacle frame that it equips.

Furthermore, this type of detachable assembly can only be envisaged with a metallic spectacle frame.

Similarly, the median bridge of a metallic spectacle frame provided with such nasal equipment must necessarily comprise a central bar for the rest or interlocking of the central bar of the nasal equipment, thereby imposing a particular aesthetic-appeal at the central portion of frames equipped in this way.

The present invention allows to overcome these drawbacks, especially by proposing a particularly efficient detachable assembly method.

In a more precise manner, the present invention concerns nasal equipment for a spectacle frame of the type comprising in a single piece a central bar and two lateral pads each intended to interlock on the corresponding eyewire of the frame, and wherein the central bar is provided with at least one recess in which is disposed at least one male interlocking element intended to cooperate with a recess provided in each eyewire of the frame.

According to a first embodiment of the invention, the central bar of the nasal equipment comprises a single recess, the axis of which is perpendicular to the symmetry plane of the nasal equipment and in which are disposed two interlocking male elements between which acts a spring functioning by compression and ensuring the maintenance in the recess of each eyewire of the useful end of the corresponding interlocking male element.

According to a second embodiment of the invention, in the central bar of the nasal equipment are provided two recesses each of which being adapted to receive a spring functioning by compression and a male interlocking element on which the said spring acts.

In an advantageous manner, the male interlocking element is formed of a single piece by a first cylinder intended to slide in the corresponding recess of the central bar and extended by a second cylinder having a small diameter and constituting the useful end intended to interlock in the recess provided for this purpose in the corresponding eyewire of the frame.

The present invention also relates to a spectacle frame, made of metal or plastic material provided with nasal equipment according to the invention.

BRIEF DESCRIPTION OF THE DRAWINGS

The characteristics and advantages of the invention will appear from reading through the following description with reference to the annexed drawings in which.

DETAILED DESCRIPTION OF THE DRAWINGS

Figure 1:
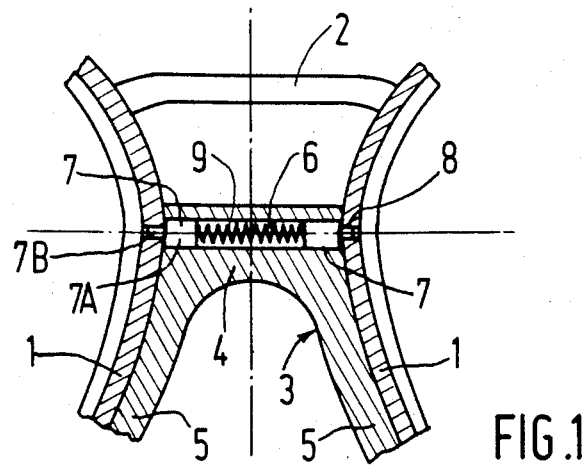
FIG. 1 is partial sectional view of the central portion of a spectacle frame provided with nasal equipment according to the invention along a plane perpendicular to the symmetry plane of the nasal equipment or of the frame.

FIG. 1 represents the central portion of a spectacle frame comprising lens surrounds or eyewires 1 connected to each other at their upper portion by a median bridge 2 that is constituted, for example, by a simple cross-bar.

Such a spectacle frame is associated to nasal equipment 3 comprising in a single piece a central bar 4 and two lateral pads 5 each adapted to interlock on the corresponding eyewire 1.

In order to allow this interlocking, the lateral pads 5 present on their opposite faces a groove having a shape complementary to the corresponding portion of the eyewire on which it is engaged.

In the central bar 4 is provided a recess 6 at the ends of which are engaged two interlocking male elements 7.

Each male element 7 is formed in a single piece of a first cylinder 7A intended to slide in the recess 6, which first cylinder is extended by a second cylinder 7B having a smaller diameter and constituting the useful interlocking end of the element 7.

This second cylinder 7B is intended to be engaged in a recess 8 provided for this purpose in the corresponding eyewire of the frame.

In order to ensure the maintenance of the ends 7B of the interlocking elements in the corresponding recesses 8, a spring 9 functioning by compression is disposed between the two elements 7 and bears on the external transverse faces of the cylinders 7A.

Preferably, the spring 9 is rendered integral with the transverse faces of the cylinders 7A, for example, by welding.

The assembly of the nasal equipment 3 on the frame is particularly simple and rapid.

It is sufficient to engage by the bottom the nasal equipment 3 on the eyewires 1, the grooves that are presented on the opposite faces of the lateral pads 5 allowing an efficient control. During this movement, the interlocking elements 7 slide towards each other in the recess 6 through the effect of the contact of cylinders 7B on the eyewires 1.

When the cylinders 7B are in interlocking position opposite the recesses 8, they are engaged in the said recesses under the effect of the spring 9 and are maintained in position by it.

An efficient maintenance is thus provided for the nasal equipment 3 and it is not necessary that a rest bar or interlocking bar connecting the two eyewires 1 at the level of the central bar 4 be provided on the frame.

The disconnection of the nasal equipment is made by engaging between the eyewire 1 and the nasal equipement 3, on one side or on both sides, a flat tool so as to disengage the cylinders 7B from the recesses 8 and then in drawing the said nasal equipment towards the bottom.

Figure 2:
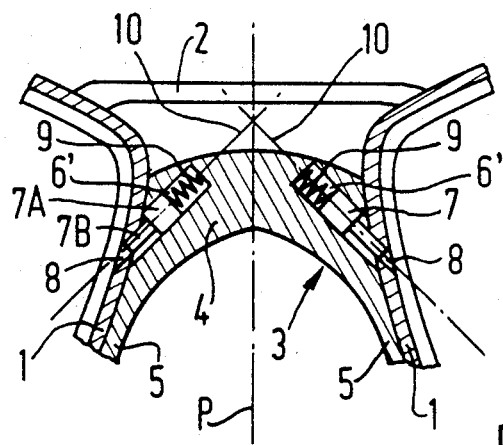
FIG. 2 is a view similar to that of FIG. 1 showing a section of a second embodiment of the nasal equipment according to the invention.

In the second embodiment of the nasal equipment according to the invention, such as represented in FIG. 2, two recesses 6' are provided in the central bar 4.

Each recess 6' is adapted to receive a male interlocking element 7 on which acts, as in the first embodiment, a spring 9 functioning by compression, this spring 9 bearing on the bottom of the recess 6' and on the external transverse face of the cylinder 7A.

Preferably, the spring 6' is rendered integral with the male element 7.

The axis 10 of the two recesses 6' are contained in a single plane perpendicular to the symmetry plane P of the nasal equipment, and form between them a determined angle that can vary according to the geometry of the central bar 4 and the configuration of the eyewire 1 in the central portion of the frame.

The assembly and disconnection of the nasal equipment 3 according to this second embodiment is made as described herein-above for the first embodiment.

Of course, the present invention is not limited to the embodiments described and represented but encompasses all possible variations thereof.

In particular, the cylinder 7A of the male interlocking element 7 can comprise on the side of its external transverse face a cavity adapted to receive the spring 9.

According to another embodiment, the two male elements 7 and the spring 9 used in the first embodiment represented in FIG. 1 can be replaced by a single piece consisting of a spring functioning by compression, the two ends of which are shaped according to the axis of the spring in order for each to constitute an interlocking element analogue to the cylinder 7B of the male element 7, the interlocking element intended to be engaged in the recess 8 of the corresponding eyewire of the frame.

This latter variant is also applicable to nasal equipment represented in FIG. 2. In this case only a single end of the spring is shaped to be engaged in the recess 8 of the corresponding eyewire 1, the opposite end bearing on the bottom of the recess 6'.

What is claimed is:

1. Nasal equipment for a spectacle frame, comprising a single piece including a central bar and two lateral pads extending from said central bar, each lateral pad intedned to interlock on a corresponding eyewire of the frame, the central bar being provided with at least one first recess, and at least one male interlocking element disposed in said at least one first recess and means for biasing said at least one male interlocking element into a second recess provided in each eyewire of the frame to lock said nasal equipment to said spectacle frame.

2. Nasal equipment according to claim 1, wherein the central bar includes a single first recess having an axis perpendicular to the symmetry plane of the nasal equipment, two interlocking male elements are disposed in said single first recess, and said means for biasing includes a spring positioned between said two male interlocking elements to bias the latter into two second recesses by compression to ensure the maintenance of each male interlocking element in the respective second recess.

3. Nasal equipment according to claim 1, wherein the central bar includes two first recesses, each receiving a spring and a male interlocking element.

4. Nasal equipment according to claim 3, wherein axes of the first recesses are situated in a single plane perpendicular to the symmetry plane of the nasal equipment and form between them a predetermined angle.

5. Nasal equipment according to claim 1, wherein each male interlocking element is formed of a single piece by a first cylinder intended to slide in the corresponding first recess of the central bar and extended by a second cylinder having a smaller diameter and constituting a useful end inteded to interlock in a respective second recess of a corresponding eyewire of the frame.

6. Nasal equipment according to claim 1, wherein said means for biasing includes a spring and the interlocking male element is constituted by an end of said spring which is shaped so as to be engaged in a second recess of a corresponding eyewire.

7. Nasal equipment according to claim 1, wherein said spectacle frame includes two lens eyewires connected by a median bridge.

8. Nasal equipment according to claim 2, wherein said spectacle frame includes two lens eyewires connected by a median bridge.

* * * * *